United States Patent [19]
Ebihara et al.

[11] Patent Number: 5,625,382
[45] Date of Patent: Apr. 29, 1997

[54] DISPLAY-INTEGRATED TABLET

[75] Inventors: Masaji Ebihara; Yasusi Nakato, both of Kanagawa-ken, Japan

[73] Assignee: Mitsubishi Denki Kabushiki Kaisha, Tokyo, Japan

[21] Appl. No.: 396,882

[22] Filed: Mar. 1, 1995

Related U.S. Application Data

[63] Continuation of Ser. No. 988,745, Dec. 10, 1992, abandoned.

[30] Foreign Application Priority Data

Feb. 21, 1992 [JP] Japan ..................... 4-034676

[51] Int. Cl.⁶ ......................................... G09G 3/02
[52] U.S. Cl. .......................... 345/173; 345/179; 178/18
[58] Field of Search ........................... 345/173, 174, 345/179, 181, 182, 156, 176; 178/18, 19

[56] References Cited

U.S. PATENT DOCUMENTS

| | | | |
|---|---|---|---|
| 4,639,720 | 1/1987 | Rympalski et al. | 345/174 |
| 4,819,194 | 4/1989 | Koizumi et al. | 178/18 |
| 4,841,290 | 6/1989 | Nakano et al. | 340/712 |
| 4,853,494 | 8/1989 | Suzuki | 340/712 |
| 4,886,943 | 12/1989 | Suzuki et al. | 345/173 |
| 5,053,757 | 10/1991 | Meadows | 345/173 |
| 5,231,381 | 7/1993 | Duwaer | 178/18 |
| 5,298,689 | 3/1994 | Mohri et al. | 178/19 |

FOREIGN PATENT DOCUMENTS

| | | | |
|---|---|---|---|
| 2242417 | 8/1972 | Germany. | |
| 2854398 | 7/1979 | Germany. | |
| 63-228005 | 1/1989 | Japan. | |
| 2-255911 | 10/1990 | Japan. | |
| 2155641 | 9/1985 | United Kingdom | 345/173 |

*Primary Examiner*—Richard Hjerpe
*Assistant Examiner*—Lun-Yi Lao
*Attorney, Agent, or Firm*—Wolf, Greenfield & Sacks, P.C.

[57] ABSTRACT

A display-integrated tablet consuming less power and capable of detecting positions only with top (row) electrodes of a matrix panel without using bottom (column) electrodes of the matrix panel with which position detection is difficult. A display-integrated tablet with a matrix panel having top (row) and bottom (column) electrodes, a top-electrode (row-electrode) drive, a bottom-electrode (column-electrode) driver, a top (row) electrode position detecting section, a bottom (column) electrode position detecting section having a memory storing detection voltage levels and x- and y-coordinate values corresponding to a certain number of dot positions on the panel, and a position detecting conductor, and performing display and position detection by means of time division. It is possible to decrease power consumption without supplying scanning pulses simultaneously to many electrodes (e.g. 20 electrodes) because scanning pulses are supplied only to top (row) electrodes to perform position detection in the position detection mode of the display-integrated tablet by using no bottom (column) electrode.

7 Claims, 8 Drawing Sheets

DISPLAY-INTEGRATED TABLET

This application is a continuation, of application Ser. No. 07/988,745, filed Dec. 10, 1996, now abandoned.

BACKGROUND OF THE INVENTION

1. Field of the Invention

The present invention prelates to a display-integrated tablet made by integrating a tablet for inputting position coordinates with a display.

2. Description of the Prior Art

Figure 9:
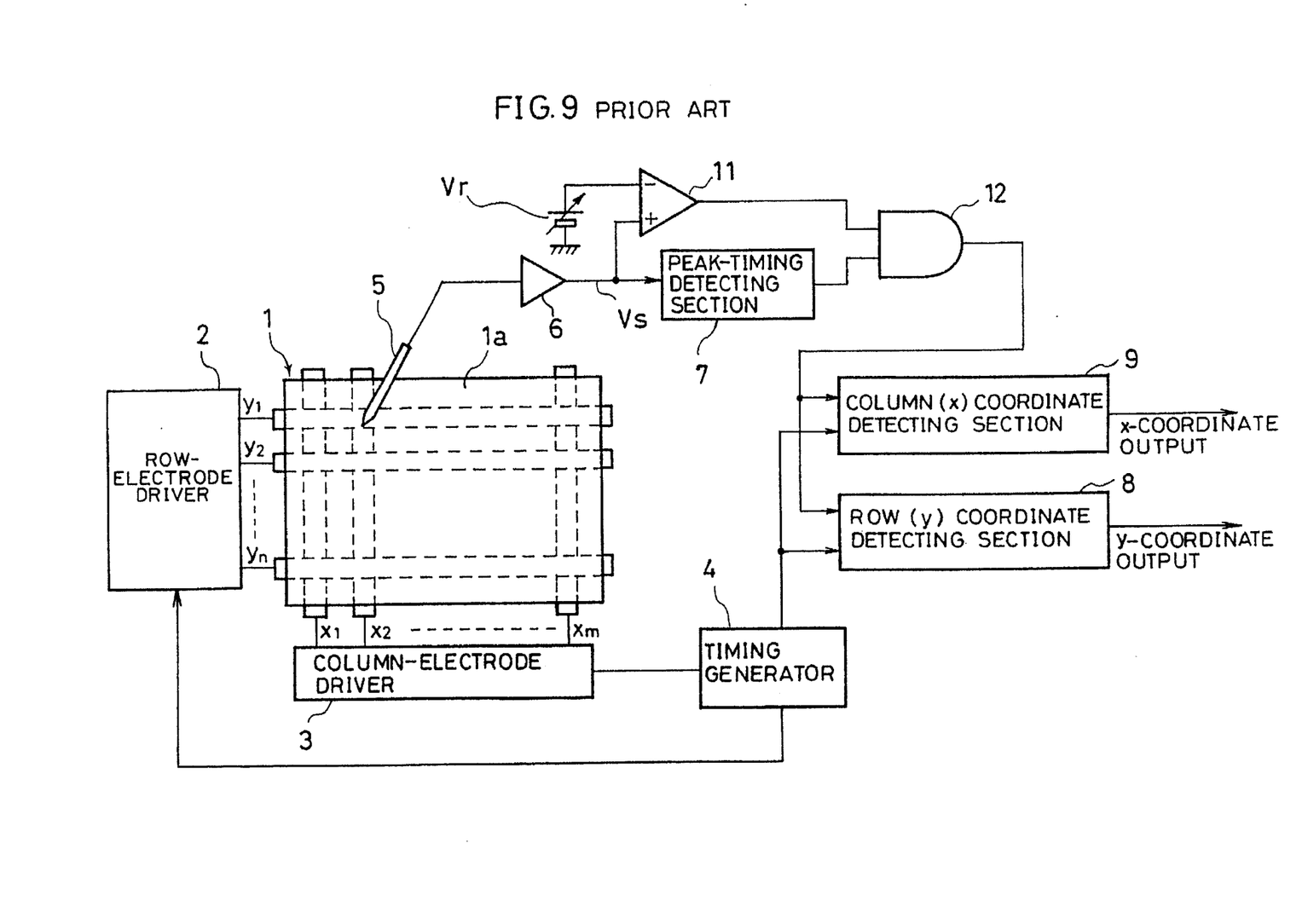
FIG. 9 shows a block diagram of an existing display-integrated tablet.

For example, FIG. 9 is a block diagram showing the constitution of the existing display-integrated tablet disclosed in the official gazette of Japanese Patent Laid-open No. 255911/1990. In FIG. 9, symbol 1 is a thin-film EL (electroluminescence) matrix panel in which a plurality of row (top) electrodes $Y_1, Y_2, \ldots,$ and $Y_n$ serving as first electrodes and a plurality of column (bottom) electrodes $x_1, x_2, \ldots,$ and $x_n$ provided under the first electrodes and serving as second electrodes are arranged like a lattice and a panel surface $1a$ is mounted on the first electrodes. Symbol 2 is a row (top) electrode driver (first-electrode driver), 3 is a column (bottom) electrode driver (second-electrode driver), and 4 is a timing generator. The row (top) electrode driver 2 and the column (bottom) electrode driver 3 are controlled by the timing generator 4.

Symbol 5 is a pen-type position detecting conductor (hereafter referred to as "pen"), 6 is a detection-signal amplifier, 11 is a comparator, 12 is an AND circuit, and 7 is a peak-timing detecting section for detecting the peak timing of the detection level for scanning-pulse capacitance linkage.

Symbol 8 is a row coordinate (y coordinate) detecting section (first-electrode position detecting section), and 9 is a column coordinate (x coordinate) detecting section (second-electrode position detecting section).

Figure 10:
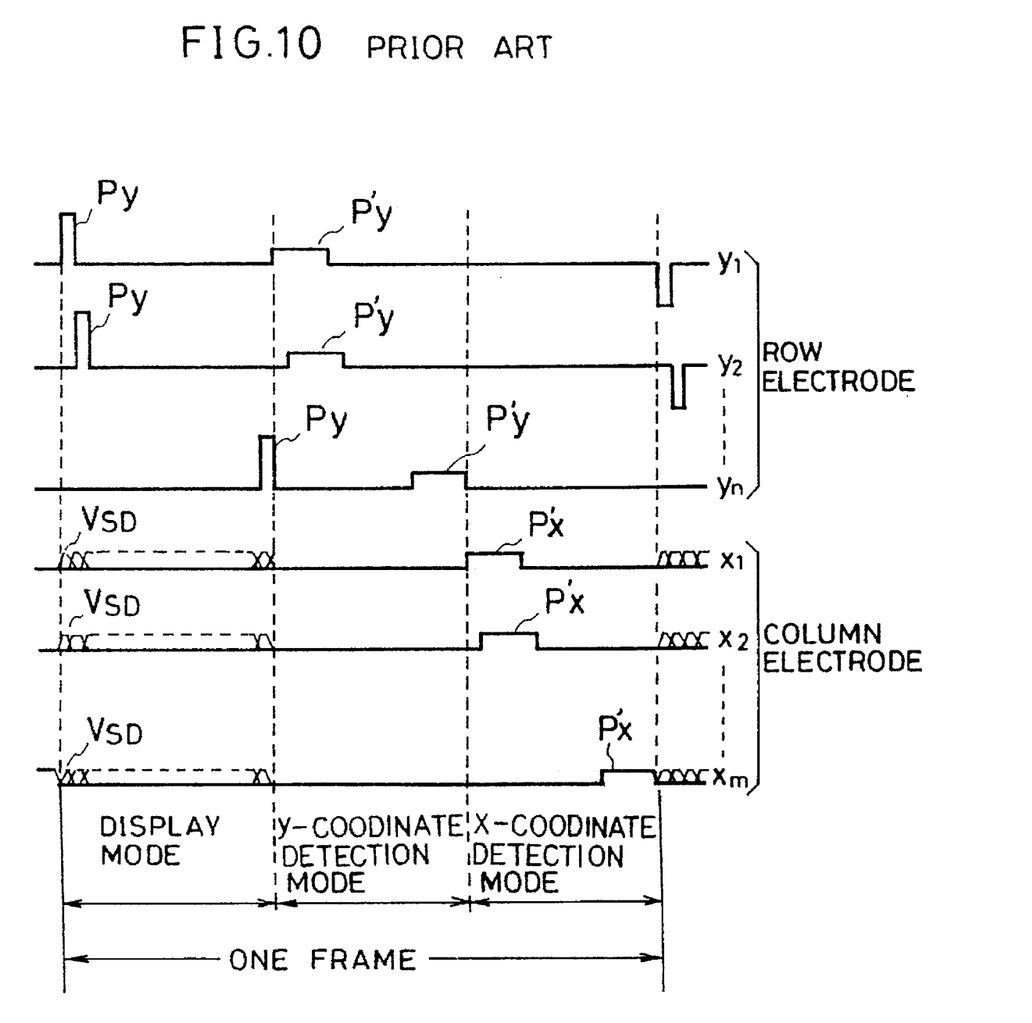
FIG. 10 shows a drive timing chart of an existing display-integrated tablet.

And, FIG. 10 shows the drive timing for the panel 1.

The following is the description of the operation. As shown in FIG. 10, a scanning pulse Py is sequentially supplied to the row electrodes $Y_1, Y_2, \ldots,$ and $Y_n$ from the row electrode driver 2 in the display data $V_{SD}$ supplied simultaneously to the column electrodes $x_1, x_2, \ldots,$ and $x_n$ from the column-electrode driver 3 for each scanning line. Therefore, display drive according to line sequential scanning is performed and an image corresponding to the display data $V_{SD}$ is displayed.

In the row-coordinate (y-coordinate) detection mode, the scanning pulse Py' is sequentially supplied to the row electrodes $Y_1, Y_2, \ldots,$ and $Y_n$ from the row-electrode driver 2. In this case, while the scanning pulse Py' is simultaneously supplied to a plurality of adjacent electrodes among the row electrodes $Y_1, Y_2, \ldots, Y_n$ the adjacent electrodes are sequentially scanned. That is, the width of the scanning pulse Py' is increased and seqnential scanning is performed while the scanning pulse Py' is simultaneously supplied to a plurality of adjacent electrodes (e.g. 20 adjacent electrodes).

In the column-coordinate (x coordinate) detection mode, the scanning pulse Px' is sequentially supplied to the row electrodes $x_1, x_2, \ldots,$ and $x_n$ from the column-electrode driver 3. In this case, while the scanning pulse Px' is simultaneously supplied to a plurality of adjacent electrodes among the row electrodes $x_1, x_2, \ldots,$ and $x_n$, the adjacent electrodes are sequentially scanned. That is, the width of the scanning pulse Px' is increased and sequential scanning is performed while the scanning pulse Px' is simultaneously supplied to a plurality of adjacent electrodes (e.g. 20 adjacent electrodes).

And, periods for display mode, row-coordinate detection mode, and column-coordinate detection mode are optionally set in each frame by means of time division.

Moreover, by contacting the pen 5 with any position on the panel 1, one of the scanning pulses Px' and Py' is detected as a detection signal due to capacitance linkage.

The detection signal of the pen 5 is supplied to and amplified by the amplifier 5. The detection signal Vs outputted from the amplifier 6 is supplied to the comparator 11 and compared with the reference voltage Vr. From the comparator 11, the high-level signal "1" is outputted when the detection signal Vs is higher than the reference voltage Vr and the low-level signal "0" is outputted when the former is lower than the latter. The output signal of the comparator 11 is supplied to the AND circuit 12.

The detection signal Vs outputted from the amplifier 6 is supplied to the peak-timing detecting section 7. From the peak-timing detecting section 7, the detection signal Vs is outputted, that is, the high-level signal "1" is outputted at the peak timing of the detection level for capacitance linkage of the scanning pulse and the low-level signal "0" is outputted except for the peak timing. The output signal of the peak-timing detecting section 7 is supplied to the AND circuit 12.

From the AND circuit 12, the high-level signal "1" is outputted only when the detection signal Vs is higher than the reference signal Vr and the peak timing of the detection signal is detected and the low-level signal "0" is outputted except for the above case. The output signal of the AND circuit 12 is supplied to the row-coordinate detecting section 8 and the column-coordinate detecting section 9.

In this case, the row-coordinate detecting section 8 comprises a counter, to which a reset signal is supplied from the timing generator 4 and reset before the row-coordinate detection mode is set. At the same time, clocks are supplied and counted at the timing when the scanning pulse Py is sequentially supplied to the row electrodes $Y_1, Y_2, \ldots,$ and $Y_n$ of the panel 1 and counting is stopped at the timing when the output signal of the AND circuit 12 is set to "1". Therefore, a counted value corresponding to any position on the panel 1 with which the pen 5 contacts is obtained from the row-coordinate detecting section 5 as a row-coordinate output.

Also for the column-coordinate detecting section 9, a counted value corresponding to any position on the panel 1 with which the pen 5 contacts is obtained as a column-coordinate outpost.

Because the existing display-integrated tablet is constituted as described above, it is necessary to supply a scanning pulse to the row and column electrodes of the matrix panel or the first and second electrodes of the matrix panel 1 in the detection mode. Especially, because the detection signal level is greatly decreased due to the capacitance linkage between the second electrodes and pen-type position detecting conductor and thereby, the detection level is raised, there is a problem that the scanning pulse must be supplied simultaneously to, for example, 20 adjacent electrodes and the power consumption increases.

The present invention is made to solve the above problem and its object is to provide a display-integrated tablet realizing position detection only with the first electrodes of a matrix panel without using the second electrodes of it with which position detection is difficult in the detection mode and consuming less power.

Another object of the present invention is to provide a display-integrated tablet easily detecting electrode positions even if the scanning pulse for position detection is greatly attenuated in using a large-screen matrix panel.

SUMMARY OF THE INVENTION

The present invention comprises a matrix panel in which first and second electrodes are arranged like a lattice, first- and second-electrode drivers for supplying signals to the both electrodes respectively, first- and second-electrode detecting sections for specifying the both electrodes respectively, and a position detecting conductor, in which the second-electrode position detecting section has a memory previously storing the values of a plurality of scanning pulses detected through capacitance linkage and the then detected positions by contacting the position detecting conductor with the matrix panel on the first electrodes to which scanning pulses are supplied from the first-electrode driver and the second electrodes at a position with which the position detecting conductor contacts is detected with the scanning-pulse detected value level at the peak timing of the scanning-pulse values detected though capacitance linkage and the memory of the second-electrode position detecting section by contacting the position detecting conductor with any position on the panel when scanning pulses are supplied to each first electrode on the panel from the first-electrode driver in the position detection mode.

In the position detection mode, a second electrode at the contacting position of the position detecting conductor is detected with the detected scanning-pulse values when scanning pulses are supplied to the both ends of each first electrode from the first-electrode driver and when the pulses are supplied to one end of each first electrode from the driver and with the memory of the second-electrode position detecting section.

Because the display-integrated tablet of the present invention is constituted as described above, it is possible to detect positions only with the first electrodes of the matrix electrodes having higher detection level through capacitance linkage and detect a second electrode of the detecting conductor contacting any position on the panel by supplying scanning pulses only to the first electrodes in the position detection mode. Moreover, because detection is performed only with the first electrodes, it is unnecessary to supply scanning pulses simultaneously to many electrodes (e.g. 20 electrodes) and it is possible to decrease power consumption.

Furthermore, because the second-electrode position is detected by combining the cases in which scanning pulses are supplied to the both ends of each first electrode and in which they are supplied to one end of it from the first-electrode driver, electrode positions are easily detected even if scanning pulses are greatly attenuated in using a large-screen matrix panel.

The above and other objects, features, and advantages of the invention will become more apparent from the following description when taken in conjunction with the accompanying drawings.

DESCRIPTION OF THE PREFERRED EMBODIMENTS

Embodiment 1

Figure 1:
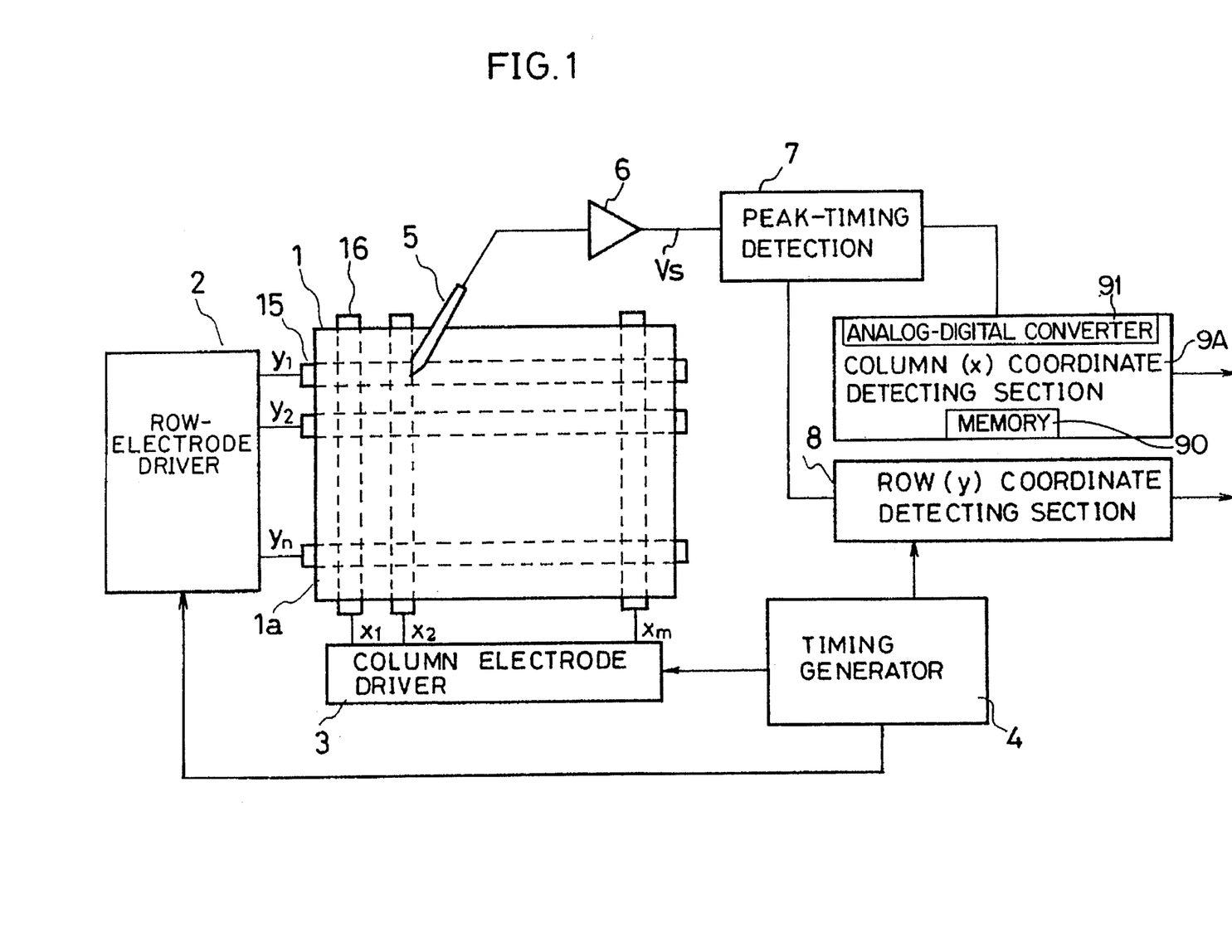
FIG. 1 shows a block diagram of Embodiment 1 of the display-integrated tablet according to the present invention.
Figure 2:
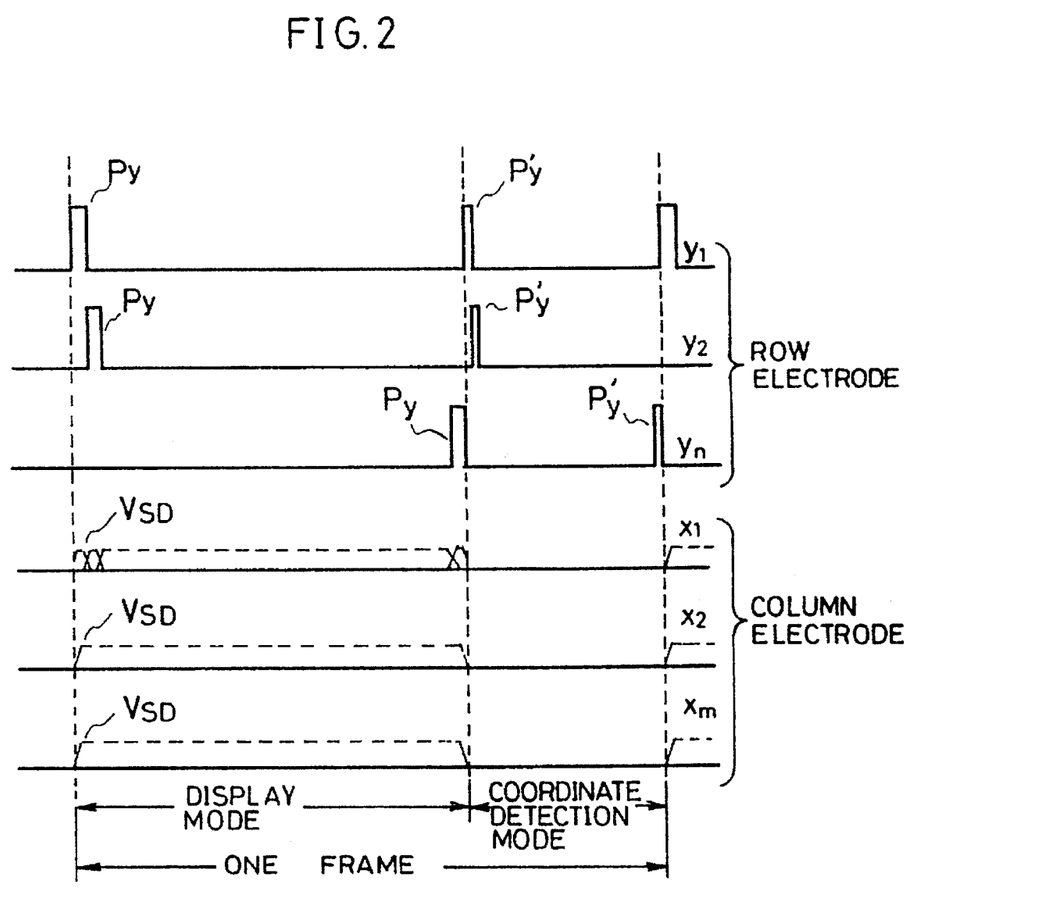
FIG. 2 shows a drive timing chart of Embodiment 1 of the display-integrated tablet according to the present invention.

An embodiment of the present invention is described below by referring to the drawings. FIG. 1 is a block diagram of the display-integrated tablet of an embodiment of the present invention, FIG. 2 is a drive timing chart for the matrix panel of an embodiment of the present invention, FIG. 3 is a diagram showing a selected electrode position for preparing the memory of a bottom electrode position detecting section, FIG. 4 is a diagram showing the relationship between the scanning-pulse voltage level Vs and the x coordinate detected by a pen 5 contacting a panel 1 just a row (top) electrode $Y_n$ to which the scanning pulse Py' is supplied.

In FIG. 1, symbol 1 is a simple matrix liquid-crystal panel in which a plurality of first electrodes $Y_1, Y_2, \ldots,$ and $Y_n$ and a plurality of second electrodes $x_1, x_2, \ldots,$ and $x_n$ provided under the first electrodes are arranged like a lattice and a panel surface 1a is set on the first electrodes, 2 is a row (top) electrode driver (first-electrode driver), 3 is a column (bottom) electrode driver (second-electrode driver), 4 is a timing generator for controlling the row-electrode driver 2 and the column electrode driver 3, 5 a pen-type position detecting conductor (hereafter referred to as "pen"), 6 is an amplifier for detection signals of the pen 5, 7 is a peak-timing detecting section for detecting the peak timing of detection level for capacitance linkage of scanning pulses, 8 is a row-coordinate (y-coordinate) detecting section comprising a counter or the like which is a top electrode position detecting section serving as a first-electrode position detecting section, and 9A is a column-coordinate (x-coordinate) detecting section comprising a memory, analog-digital converter, etc. which is a bottom electrode position detecting section serving as a second-electrode position detecting section.

Figure 3:
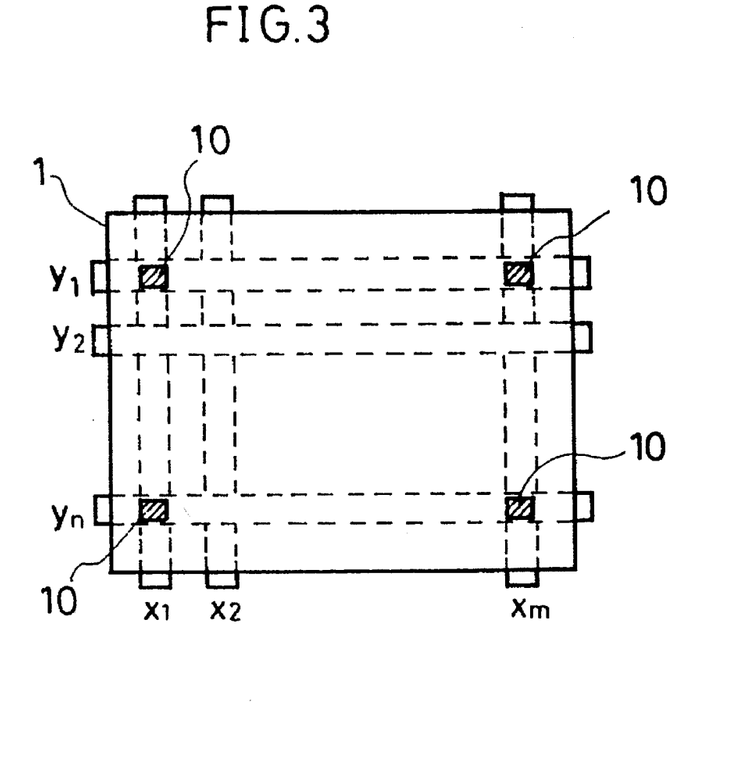
FIG. 3 shows a selected electrode position for preparing the memory of the bottom electrode position detecting section of Embodiment 1 of the display-integrated tablet according to the present invention.
Figure 4:
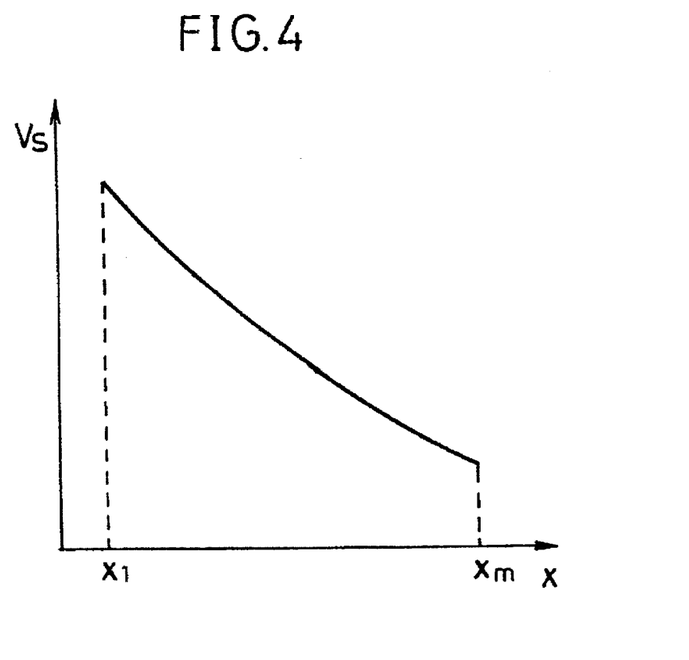
FIG. 4 shows the relationship between the voltage value and the column (x) coordinate detected by the detecting conductor contacting the row electrode $Y_n$ of Embodiment 1 of the display-integrated tablet according to the present invention to which the scanning pulse Py' is supplied.

In FIG. 3, symbol 1 is a simple matrix liquid-crystal panel and 10 is a display picture element.

The following is the operation of an embodiment of the present invention.

As shown in FIG. 2, a display mode and coordinate detection mode are provided in each frame by means of time division. In the display mode, a scanning pulse Py is sequentially supplied to the row (top) electrodes $Y_1, Y_2, \ldots, $ and $Y_n$ every electrode from the row (top) electrode driver 2 in the display mode and display data $V_{SD}$ is supplied simultaneously to the column (bottom) electrodes $x_1, x_2, \ldots, $ and $x_n$ from the column (bottom) electrode driver 3 for each scanning line. Therefore, an image corresponding to the display data $V_{SD}$ is displayed through line sequential scanning.

In the coordinate detection mode, the scanning pulse Py' is sequentially supplied to the row (top) electrodes $Y_1, Y_2, \ldots, $ and $y_n$ from the row (top) electrode driver 2.

Moreover, the scanning pulse Py' is detected through capacitance linkage by contacting the pen 5 with any position on the panel 1 as shown in FIG. 1.

The detection signal Vs of the pen 5 is supplied to the amplifier 6 and the detection signal output from the amplifier is supplied to the peak-timing detecting section 7. Moreover, the peak-timing detecting section 7 detects and outputs the detection voltage level at the peak timing of the detection signal Vs. When a detection voltage level other than the level at the peak timing is detected, the level "0" is outputted. The output of the peak-timing detecting section 7 is supplied to the y-coordinate detecting section 8 and the x-coordinate detecting section 9A. In this case, the y-coordinate detecting section 8 is reset by the timing generator before the position detection mode starts, clocks are supplied at the timing when scanning pulses are sequentially supplied to the row electrodes $Y_1, Y_2, \ldots, $ and $Y_n$ of the panel 1, and counting is stopped at the timing when the output of the peak-timing detecting section 7 rises to the high level from "0". Therefore, a counted value corresponding to any position of the panel 1 with which the pen 5 contacts is obtained from the y-coordinate detecting section 8 as a y-coordinate output. In the x-coordinate detecting section 9A, a voltage value when the output of the peak-timing detecting section 7 reaches the high level is A-D-converted by the analog-digital converter 91 and an x-coordinate corresponding to any position of the panel 1 with which the pen 5 contacts is obtained through interpolation with the A-D-converted data and a plurality of voltage data values stored in the memory 90 and detected by the pen 5 on the panel.

FIG. 3 shows an example of panel display of the selected electrode for preparing the memory of the x-coordinate detecting section for x-coordinate position detection. For this example, four dot positions 10 are selected, scanning pulses are supplied to a corresponding row electrode, and voltage data obtained by contacting the pen 5 with these dot positions 10 and x- and y-coordinates corresponding to the data are stored in the memory of the x-coordinate detecting section 9A to perform initialization for x-coordinate detection. For this embodiment, four positions are used. However, it is possible to improve the position detecting accuracy by increasing the number of dots to be displayed.

FIG. 4 shows the relationship between the voltage level Vs due to capacitance linkage and the x coordinate detected by the pen 5 contacting the panel 1 on a row (top) electrode $Y_n$ to which the scanning pulse Py' is supplied in the position detection mode. When the scanning pulse Py' is slipplied to the row (top) electrode $Y_n$, the scanning pulse Py' is attenuated depending on the inter-electrode capacity and the level Vs detected by the pen 5 is also attenuated depending on the x-coordinate position as the distance in the $x_m$ direction from the electrode end (it is assumed that the electrode end is present at the left end of the electrodes $Y_1, Y_2, \ldots, $ and $Y_n$ in FIG. 3) increases. Therefore, the x position or second electrodes $x_1, x_2, \ldots, $ and $x_m$ can be specified by collating the detection Vs with the memory because the "x" corresponding to Vs is stored in the memory.

Embodiment 2

The following is the description of another embodiment of the present invention. The constitution of another embodiment is the same as that of Embodiment 1, in which a plurality of adjacent row electrodes (e.g. 3 electrodes) among the row electrodes $Y_1, Y^2, \ldots, $ and $y_n$ are sequentially scanned while they are provided with the scanning pulse Py' in the position detection mode. In this case, because the scanning pulse Py' is supplied simultaneously to a plurality of adjacent electrodes, the detection signal level of the pen 5 rises and the position detecting accuracy is improved compared with the case in which the scanning pulse Py' is supplied only to an electrode.

Embodiment 3

Figure 5:
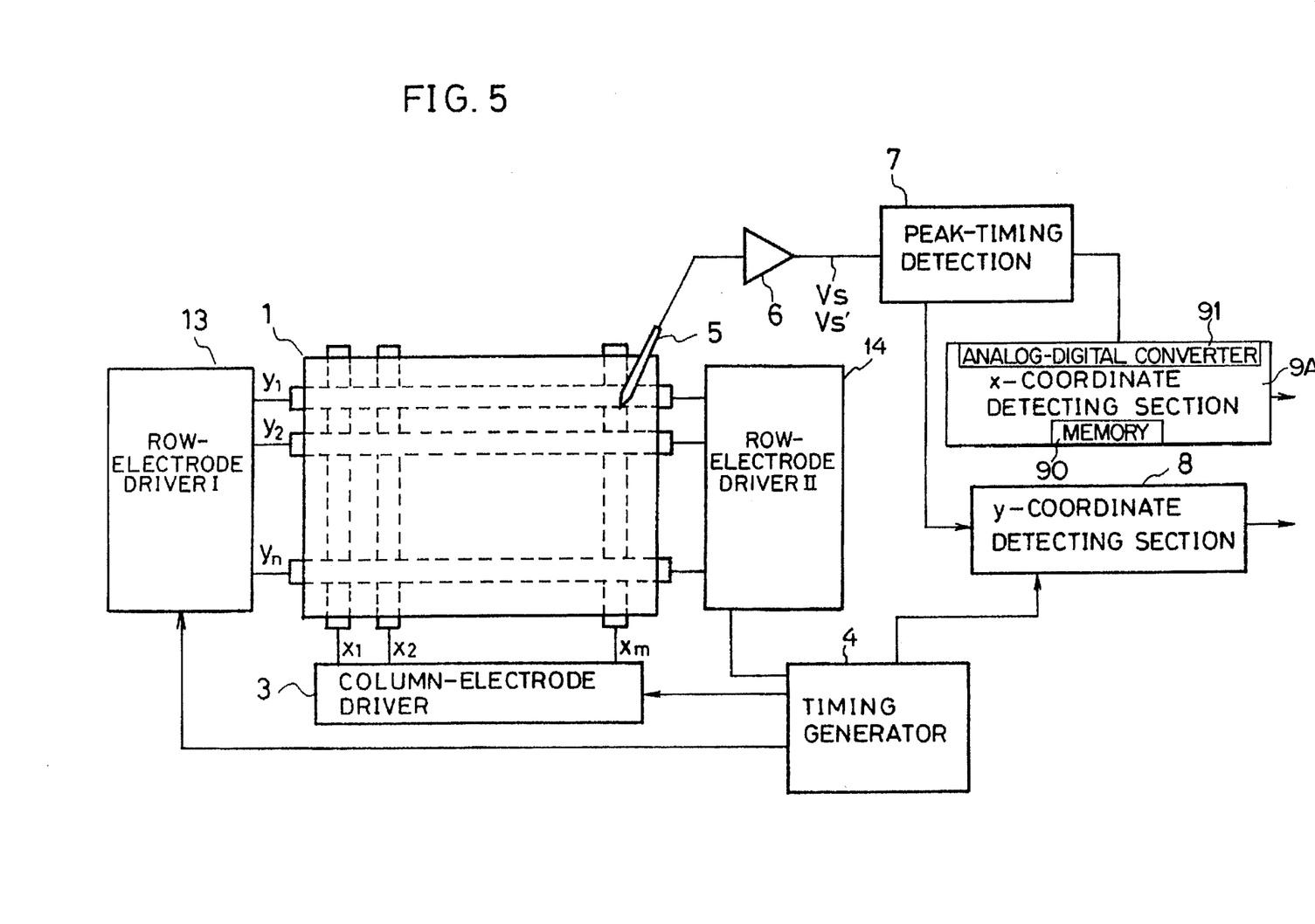
FIG. 5 shows a block diagram of Embodiment 3 of the display-integrated tablet according to the present invention.
Figure 6:
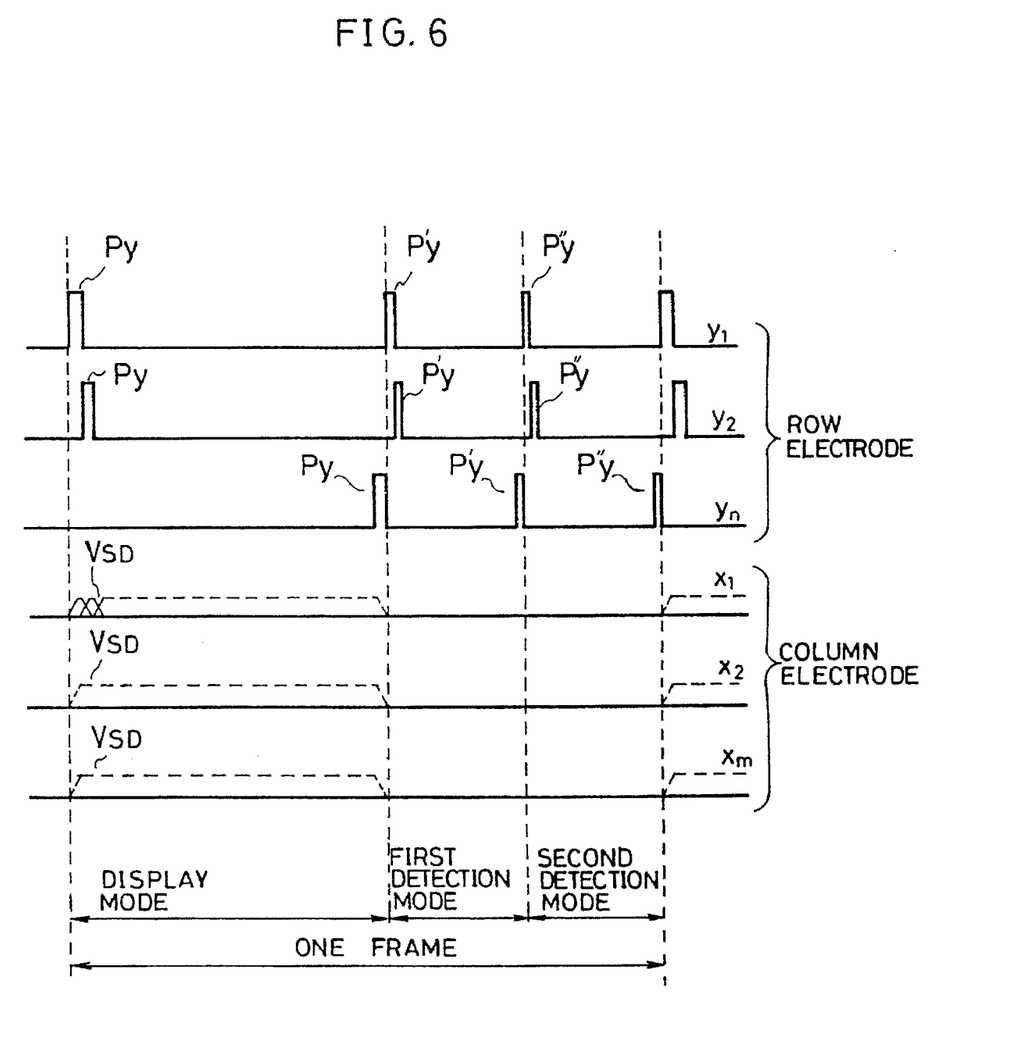
FIG. 6 shows a drive timing chart of Embodiment 3 of the display-integrated tablet according to the present invention.
Figure 7:
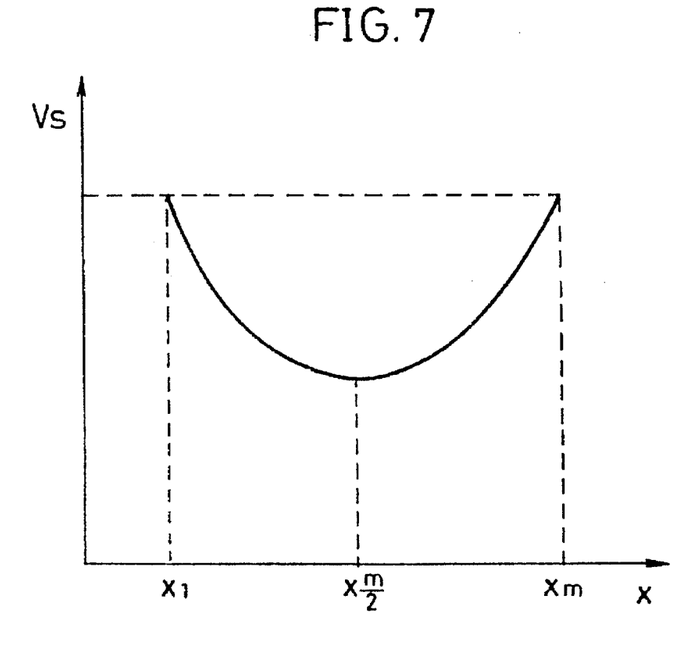
FIG. 7 shows the relationship between the voltage value and the column (x) coordinate detected by the detecting conductor contacting the row electrode $y_n$ of Embodiment 3 of the display-integrated integrated tablet according to the present invention to which the scanning pulse Py' is supplied.
Figure 8:
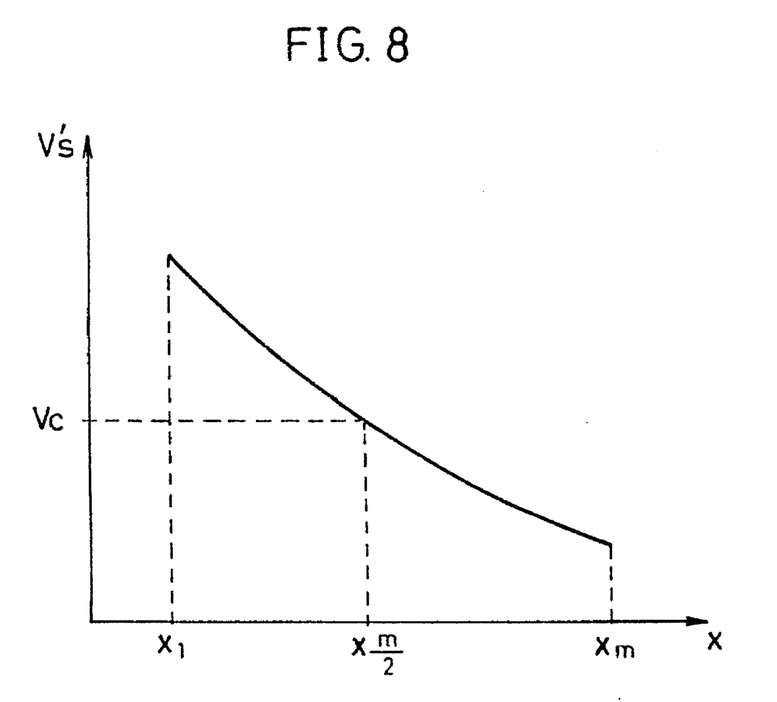
FIG. 8 shows the relationship between the voltage value and the column (x) coordinate detected by the detecting conductor contacting the row electrode $y_n$ of Embodiment 3 of the display-integrated tablet according to the present invention to which the scanning pulse Py" is supplied.

Still another embodiment of the present invention is described. below by referring to FIG. 5. In FIG. 5, symbol 13 is a row-electrode driver I and 14 is a row-electrode driver II, each of which is connected to the both ends of the row electrodes $Y_1, Y_2, \ldots, $ and $Y_n$. As shown in FIG. 6, a display mode and coordinate detection mode are provided in each frame by means of time division. In the display mode, the scanning pulse Py is supplied to the row electrodes $Y_1, Y_2, \ldots, $ and $Y_n$ only from the row-electrode driver I 13 to divide the position detection mode into a first detection period and a second detection period. In the first detection period, the scanning pulse Py' is supplied to the row electrodes $Y_1, Y_2, \ldots, $ and $Y_n$ at the same phase from the row-electrode driver I 13 and the row-electrode driver II 14. In this case, the relationship between the voltage level Vs and the x coordinate detected by the pen 5 contacting the panel on a row electrode $Y_n$ to which the scanning pulse Py' is supplied is shown in FIG. 7. In the second detection period, the scanning pulse Py" is supplied to the row electrodes $Y_1, Y_2, \ldots, $ and $Y_n$ from the row-electrode driver I 13. In this case, the relationship between the voltage level Vs' and the x coordinate detected by the pen 5 contacting the panel on a row electrode $Y_n$ to which the scanning pulse Py" is supplied is shown in FIG. 8.

In the first detection period, similarly to the above embodiment, a row coordinate is obtained from the row (y) coordinate detecting section at the peak timing of the detection voltage Vs. The detection voltage value at the peak timing is provided with a point in the intervals between $x_1$ and $x_{m/2}$ and between $x_{m/2}$ and $x_m$ respectively by assuming the x coordinate at the center of a column electrode as $x_{m/2}$ on the column (x) coordinate as shown in FIG. 7. Therefore, by comparing the detection voltage value Vs' with the detection voltage value Vc at the center $x_{m/2}$ of the row electrode $Y_n$ stored in the memory in the column (x) coordinate detecting section in the second detection period, it is possible to specify that the x coordinate is present in the interval between $x_1$ and $x_{m/2}$ for Vs'>Vc and in the interval between $x_{m/2}$ and $x_m$ for Vs'<Vc. This constitution is effective for a large attenuation of the scanning pulse Py" in the detection mode when this apparatus uses a large-screen matrix panel.

Though this embodiment uses two row-electrode drivers independently, it is also possible to supply scanning pulses to the both ends of each row electrode with one row-electrode driver.

An example is described, above in which a simple matrix liquid-crystal panel is used as the matrix panel. However, the present invention is not restricted to the example but it can also be applied to other example using a TFT liquid-crystal panel or EL matrix panel plasma display.

As described above, the present invention makes it possible to realize a display-integrated tablet consuming less power and capable of easily detecting electrode positions without supplying scanning pulses simultaneously to many electrodes (e.g. 20 electrodes) because position detection is performed by supplying scanning pulses only to first electrodes in the position detection mode of the display-integrated tablet but no second electrode is used with which position detection is difficult.

Moreover, by using the means for supplying scanning pulses for position detection from the both ends of each first electrode, it is easy to detect electrode positions even if scanning pulses are greatly attenuated when a large-screen matrix panel is used.

What is claimed is:

1. A display-integrated tablet for displaying images and for detecting an input position by means of time division, the tablet comprising:

a matrix panel in which a plurality of first electrodes and a plurality of second electrodes provided under the first electrodes are arranged like a lattice and a panel surface is set on the first electrodes, a first-electrode driver and a second-electrode driver for supplying signals to the first and second electrodes respectively, a first-electrode input position detecting section and a second-electrode input position detecting section for detecting and outputting an input position with respect to both the first electrodes and the second electrodes respectively, an input position detecting conductor for detecting scanning pulses supplied to each electrode from each electrode driver through capacitance linkage with each electrode by contacting any position on the panel surface, and a peak timing detecting section for detecting the peak timings of detected scanning pulses and for sending scanning-pulse peak voltage values to the first- and second-electrode input position detecting sections, and performing display and position detection by means of time division;

wherein
   the second-electrode input position detecting section is provided with a memory in which are stored correspondences between scanning-pulse peak voltage values and a plurality of predetermined input positions with respect to the second electrodes, for scanning-pulses supplied from one end of each first electrode, and wherein
   the second-electrode input position detecting section is provided with means for determining the input position by comparing a scanning pulse peak voltage value with stored scanning-pulse peak voltage values corresponding to the respective input positions when scanning pulses are supplied to one end of each first electrode and the input position detecting conductor is contacted with any position on the panel surface, the second electrode input position detecting section further provided with means for determining input positions with respect to the second electrodes by comparing actual scanning-pulse detected values detected and the scanning-pulse peak voltage values stored in the memory.

2. A display-integrated tablet according to claim 1, wherein a second electrode with which the position detecting conductor contacts is specified by contacting the position detecting conductor with any position on the panel surface to supply scanning pulses to each first electrode and supplying the scanning pulse peak voltage values to the second-electrode position detecting section to collate the values with the memory at the time of matrix-panel position detection.

3. A display-integrated tablet for displaying images and for detecting an input position by means of time division, the tablet comprising:

a matrix panel in which a plurality of first electrodes and a plurality of second electrodes provided under the first electrodes are arranged like a lattice and a panel surface is set on the first electrodes, a first-electrode driver and a second-electrode driver for supplying signals to the first and second electrodes respectively, a first-electrode input position detecting section and a second-electrode input position detecting section for detecting and outputting an input position with respect to both the first electrodes and the second electrodes respectively, an input position detecting conductor for detecting scanning pulses supplied to each electrode from each electrode driver through capacitance linkage with each electrode by contacting any position on the panel surface, and a peak timing detecting section for detecting the peak timings of detected scanning pulses and for sending scanning-pulse peak voltage values to the first- and second-electrode input position detecting sections, and performing display and position detection by means of time division;

wherein
   both ends of each first electrode are provided with the first-electrode driver capable of supplying scanning pulses, and the second-electrode input position detecting section is provided with a memory in which are stored correspondences between first scanning-pulse peak voltage values and a plurality of input positions with respect to the second electrodes, the first scanning-pulse peak voltage values corresponding to the input positions with respect to the second electrodes when the scanning pulses are supplied from the both ends of each first electrode and the position detecting conductor is contacted with any position on the panel surface and the memory further having stored therein correspondences between second scanning-pulse peak voltage values and a plurality of input positions with respect to the second electrodes, the second scanning-pulse peak voltage values corresponding to the respective input positions when scanning pulses are supplied from one end of each first electrode and the position detecting conductor is contacted with any position on the panel surface, and the second electrode input position detecting section further provided with means for, determining input positions to the second electrodes by comparing actual scanning-pulse peak voltage values detected by regular position detection and the first and second scanning-pulse peak voltage values stored in the memory.

4. A display-integrated tablet according to claim 3, wherein second electrode with which the position detecting conductor contacts is specified by dividing the position detecting period into a first detecting period and second detecting period at the time of matrix-panel position detection, supplying scanning pulses to the both ends of each first electrode by the first-electrode driver in the first detecting period and also supplying scanning pulses to one end of each first electrode by the first-electrode driver in the second detecting period and supplying the value of each scanning pulse detected in each detecting period to the second-electrode position detecting section to collate the value with the memory.

5. A display-integrated tablet according to claim 3, wherein the first-electrode driver is provided with an electrode driver I for supplying scanning pulses from one end of each first electrode and an electrode driver II for supplying scanning pulses from the other end of each first electrode.

6. A display-integrated tablet according to claim 1 or 3, wherein the second-electrode position detecting section is provided with an A-D converter for converting the analog values detected by the peak timing detecting section into digital values.

7. A display-integrated tablet according to claim 2 or 4, wherein scanning pulses are supplied simultaneously to a plurality of first electrodes at the time of matrix-panel position detection.

* * * * *